United States Patent
Sakai

(10) Patent No.: US 10,911,817 B2
(45) Date of Patent: Feb. 2, 2021

(54) INFORMATION PROCESSING SYSTEM

(71) Applicant: NEC CORPORATION, Tokyo (JP)

(72) Inventor: Atsunori Sakai, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/415,744

(22) Filed: May 17, 2019

(65) Prior Publication Data

US 2019/0335223 A1 Oct. 31, 2019

Related U.S. Application Data

(63) Continuation of application No. 15/448,858, filed on Mar. 3, 2017, now Pat. No. 10,491,937.

(30) Foreign Application Priority Data

Mar. 4, 2016 (JP) .................... 2016-042540

(51) Int. Cl.

| H04N 21/2743 | (2011.01) |
| H04N 21/218 | (2011.01) |
| H04N 21/234 | (2011.01) |
| H04N 21/235 | (2011.01) |
| H04N 21/854 | (2011.01) |
| H04N 19/159 | (2014.01) |

(52) U.S. Cl.
CPC ....... *H04N 21/2743* (2013.01); *H04N 19/159* (2014.11); *H04N 21/21805* (2013.01); *H04N 21/234* (2013.01); *H04N 21/2353* (2013.01); *H04N 21/854* (2013.01)

(58) Field of Classification Search
CPC ......... H04N 21/2743; H04N 21/21805; H04N 21/234; H04N 21/2353; H04N 21/854; H04N 19/159
See application file for complete search history.

(56) References Cited

U.S. PATENT DOCUMENTS

| 9,455,010 B1 | 9/2016 | Chen et al. |
| 2006/0104607 A1* | 5/2006 | Grigorian ...... H04N 21/440281 |
| | | 386/329 |
| 2009/0103603 A1 | 4/2009 | Hamano |

(Continued)

FOREIGN PATENT DOCUMENTS

| JP | 2001-525636 A | 12/2001 |
| JP | 2003-37571 A | 2/2003 |

(Continued)

OTHER PUBLICATIONS

Communication dated Oct. 8, 2019 from Japanese Patent Office in counterpart JP Application No. 2016-042540.

(Continued)

*Primary Examiner* — Randy A Flynn
(74) *Attorney, Agent, or Firm* — Sughrue Mion, PLLC

(57) ABSTRACT

An information processing system includes a video processing device that processes video data including a plurality of frames, and a transmission device that transmits video data, to be processed by the video processing device, to the connected video processing device. The video processing device stores some frames constituting the video data, and the transmission device stores the remaining frames of the video data not stored in the video processing device.

6 Claims, 10 Drawing Sheets

(56) References Cited

U.S. PATENT DOCUMENTS

| | | | |
|---|---|---|---|
| 2010/0325656 A1* | 12/2010 | Hardacker | H04N 21/251 |
| | | | 725/31 |
| 2011/0131618 A1* | 6/2011 | Hasek | H04N 21/26616 |
| | | | 725/89 |
| 2013/0111056 A1 | 5/2013 | Prasad | |
| 2015/0199366 A1 | 7/2015 | Marlatt et al. | |
| 2016/0100011 A1 | 4/2016 | Park | |

FOREIGN PATENT DOCUMENTS

| | | |
|---|---|---|
| JP | 2003-153198 A | 5/2003 |
| JP | 2006-333071 A | 12/2006 |
| JP | 2008-270908 A | 11/2008 |

OTHER PUBLICATIONS

Non-Final Office Action dated Jan. 27, 2020 issued by the United States Patent and Trademark Office in U.S. Appl. No. 16/415,719.
Communication dated Jun. 25, 2019, from the Japanese Patent Office in counterpart application No. 2016-042540.

* cited by examiner

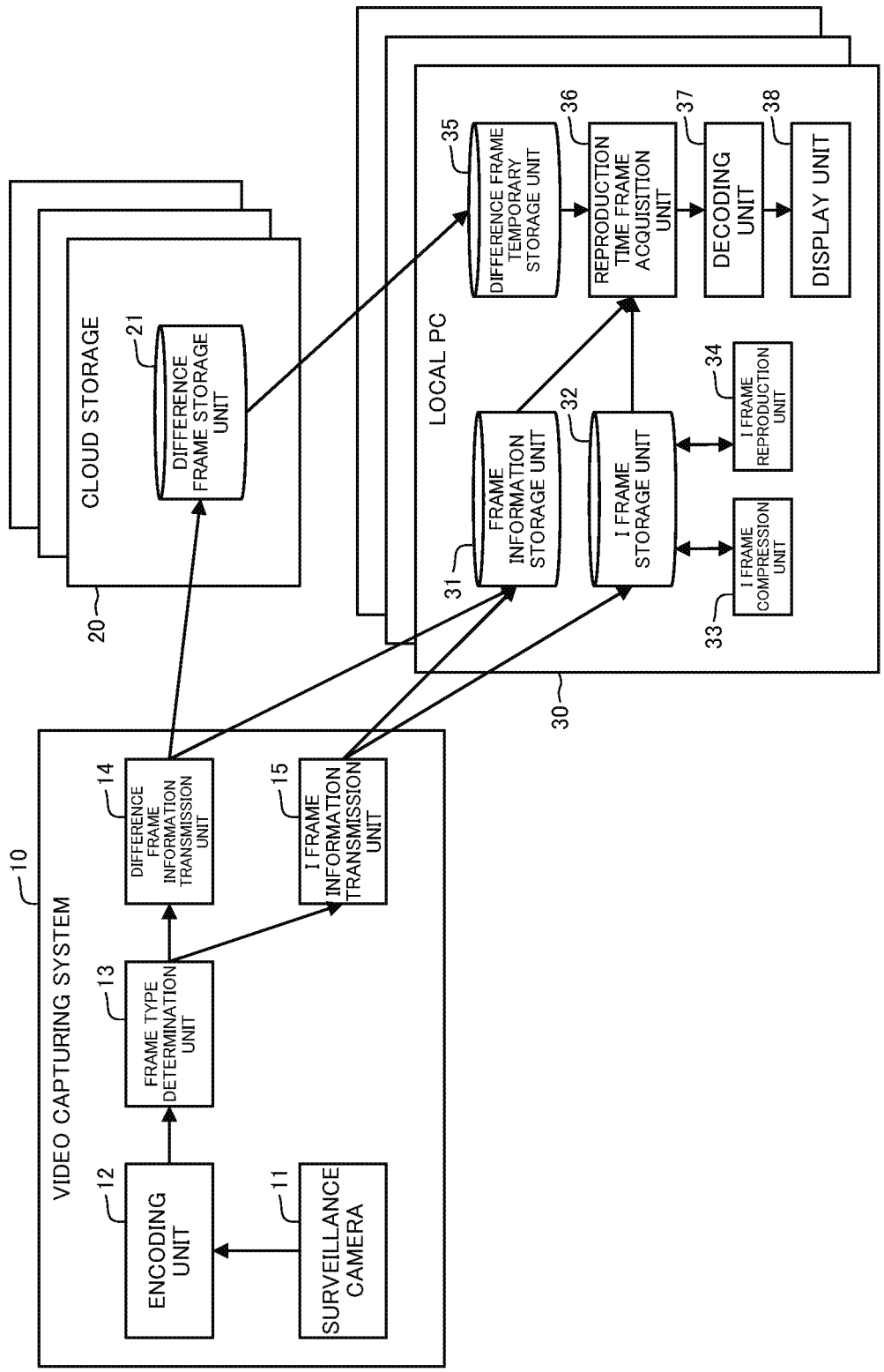

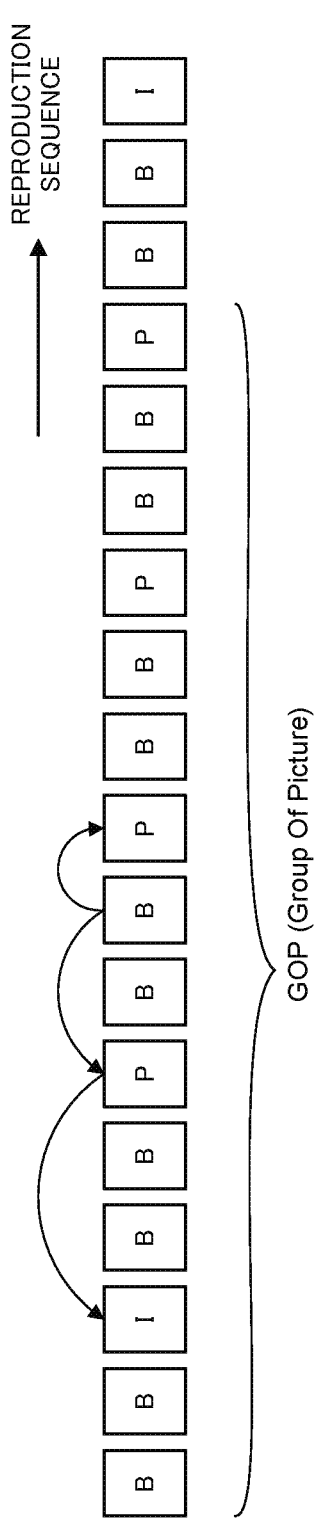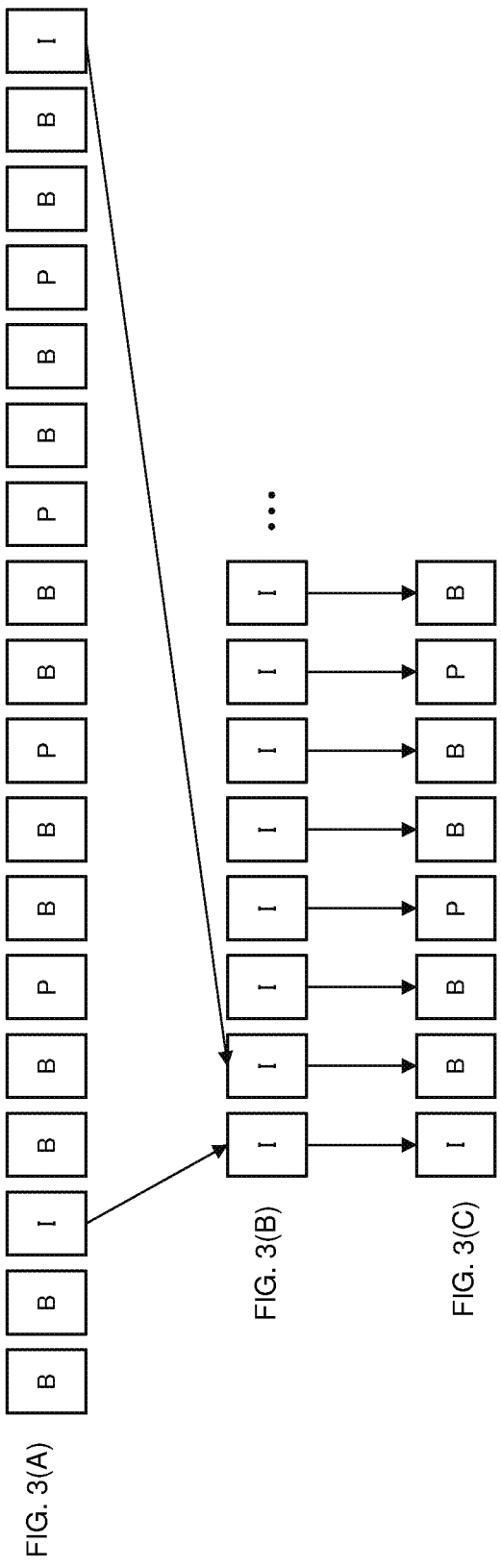

Fig. 4

| FRAME NO. | FRAME TYPE | REFERENCE FRAME NO. | FRAME STORING STATUS | CLOUD STORAGE NO. |
|---|---|---|---|---|
| 1 | I FRAME | — | STORED | — |
| 2 | B FRAME | 1,4 | NOT STORED | 2 |
| 3 | B FRAME | 1,4 | STORED | 2 |
| 4 | P FRAME | 1 | STORED | 2 |
| 5 | B FRAME | 1,4,6 | NOT STORED | 2 |
| ... | | | | |

Fig.5

| FRAME NO. | I FRAME STORAGE PATH | I FRAME COMPRESSION STATUS | FRAME TYPE AFTER COMPRESSION OF I FRAME |
|---|---|---|---|
| 1 | C:\··· | COMPRESSED | I FRAME |
| 15 | C:\··· | COMPRESSED | B FRAME |
| 30 | C:\··· | UNCOMPRESSED | — |
| ⋮ | | | |

Fig.6

| FRAME NO. | DIFFERENCE FRAME STORAGE PATH |
|---|---|
| 2 | C:\··· |
| 3 | C:\··· |
| 4 | C:\··· |
| ⋮ | |

Fig.7

| FRAME NO. | DIFFERENCE FRAME STORAGE PATH |
|---|---|
| 2 | — |
| 3 | C:\··· |
| 4 | — |
| ⋮ | |

INFORMATION PROCESSING SYSTEM

CROSS REFERENCE TO RELATED APPLICATIONS

This application is a continuation of U.S. application Ser. No. 15/448,858, filed Mar. 3, 2017, which claims priority based on Japanese Patent Application No. 2016-042540 filed Mar. 4, 2016, the disclosures of which are incorporated by reference herein in their entireties.

TECHNICAL FIELD

The present invention relates to an information processing system, and in particular, to an information processing system for processing video data.

BACKGROUND ART

As security needs increase, the scale of a video surveillance system is increasing. Further, the definition of video is getting higher, and a period for storing video data is getting longer. Accordingly, the volume of video data to be stored in a video management system is increasing at an accelerating pace. Further, along with automatic detection of persons or objects by analyzing surveillance camera video images, there is also a need to store a large amount of high-quality data used as study data.

In view of such a situation, storage in a local PC is difficult to satisfy a capacity requirement for large-volume video data. Therefore, a method of arranging video data on cloud storage, having an architecture in which a large capacity and high reliability are secured, is considered. It should be noted that cloud storage means a service of lending an external storage region (storage) on the Internet.

Patent Document 1: JP 2001-525636 A

In general, however, cloud storage has the following characteristics unlike direct storage:

As it is provided at a remote site, it is not guaranteed that a network communication band is secured sufficiently, whereby communication delay becomes large; and There are consistency constraints in order to secure a large capacity and high reliability, so it is not guaranteed that recorded data can be read at any time.

It should be noted that cloud storage or the like usually has a structure of blocking reading and writing of data until data is reproduced for backup to maintain consistency.

With such characteristics as described above, in the case of placing video data on cloud storage, there is a problem a necessary video data cannot be acquired immediately whereby video data cannot be viewed on the local PC side in real time.

Specifically, the following problems are caused:

(1) When video distribution in an extremely large band is required like a case where video images of a plurality of cameras are viewed simultaneously, video distribution cannot be performed due to a shortage in the network communication hand. Even in the case of performing video analysis, large-volume video data must be transmitted to an analysis server, so it takes time to acquire video data;

(2) When attempting to perform special operation (jump, forward, or rewind) at the time of reproducing video images, response to an operation is degraded due to a communication delay between the cloud storage and a local PC (PC on which video images are to be reproduced); and (3) When attempting to reproduce or analyze video images stored before such as several seconds to several tens of seconds before, the video images may not be acquired immediately due to consistency constraints of the cloud storage.

As a technology of storing video data, there is a technology disclosed in JP 2001-525636 A (Patent Document 1), Patent Document 1 discloses a method of dividing video data and storing the divided pieces of data in different files in order to reduce the load on a server device that distributes the video data, Specifically, in order to reduce the load to carry out high-speed reproduction, compressed data is divided into anchor picture frames (I frames) and predictive picture frames (P frames and B frames), which are stored in different files.

With such a method, however, there is a problem that till impossible to reproduce video data stably at a high speed as described above. In other words, in Patent Document 1, the load on the server is reduced only because data required for high-speed reproduction is divided in advance. Therefore, there still are problems such as distribution inability or a delay due to a shortage of network communication band, lowering of response to reproduction operation, and a delay in video capturing due to consistency constraints of cloud storage.

Moreover, there is also problem that processing cannot be performed stably at a h speed not only in the case of reproducing video data but also in the case of performing any processing on video data such as analysis of video data.

SUMMARY

In view of the above, an exemplary object of the present invention is to provide an information processing system capable of solving the above-described problem, that is, a problem that video data cannot be processed stably at a high speed.

An information processing system, according to an exemplary aspect of the present invention, is configured to include a video processing device that processes video data including a plurality of frames; and a transmission device that transmits the video data, to be processed by the video processing device, to the video processing device connected, wherein the video processing device stores some frames constituting the video data, and the transmission device stores remaining frames, not stored in the video processing device, of the video data.

Further, a video processing device, according to another exemplary aspect of the present invention, is a video processing device configured to process video data including a plurality of frames, wherein the video processing device stores some frames constituting the video data, and the video processing device processes the stored some frames, and processes remaining frames constituting the video data not stored therein, upon receiving the remaining frames from a transmission device that stores the remaining frames.

Further, a non-transitory computer-readable medium storing a program, according to another exemplary aspect of the present invention, comprises instructions for causing a video processing device, configured to process video data including a plurality of frames, to perform operations including, storing some frames constituting the video data, processing the stored some frames, and processing remaining frames constituting the video data not stored in the video processing device, upon receiving the remaining frames from a transmission device that stores the remaining frames.

Further, a video data processing method, according to another exemplary aspect of the present invention, is a video data processing method for processing video data including a plurality of frames by a video processing device that stores some frames constituting the video data. The method includes by the video processing device, processing the stored some frames, and processing remaining frames constituting the video data not stored in the video processing device, upon receiving the remaining frames from a transmission device that stores the remaining frame.

As the present invention is configured as described above, video data can be processed stably at a high speed.

BRIEF DESCRIPTION OF THE DRAWINGS

FIG. 1 is a functional block diagram illustrating a configuration of an information processing system according to a first exemplary embodiment of the present invention;

FIG. 2 illustrates a data structure of video data;

FIGS. 3(A) to 3(C) illustrate a data structure of video data;

FIG. 4 illustrates an exemplary table stored e frame information storage unit disclosed in FIG. 1;

FIG. 5 illustrates an exemplary table stored in the I frame storage unit disclosed in FIG. 1;

FIG. 6 illustrates an exemplary table stored in the difference frame storage unit disclosed in FIG. 1;

FIG. 7 illustrates an exemplary table stored in the difference frame temporary storage unit disclosed in FIG. 1;

EXEMPLARY EMBODIMENT

First Exemplary Embodiment

Figure 8:
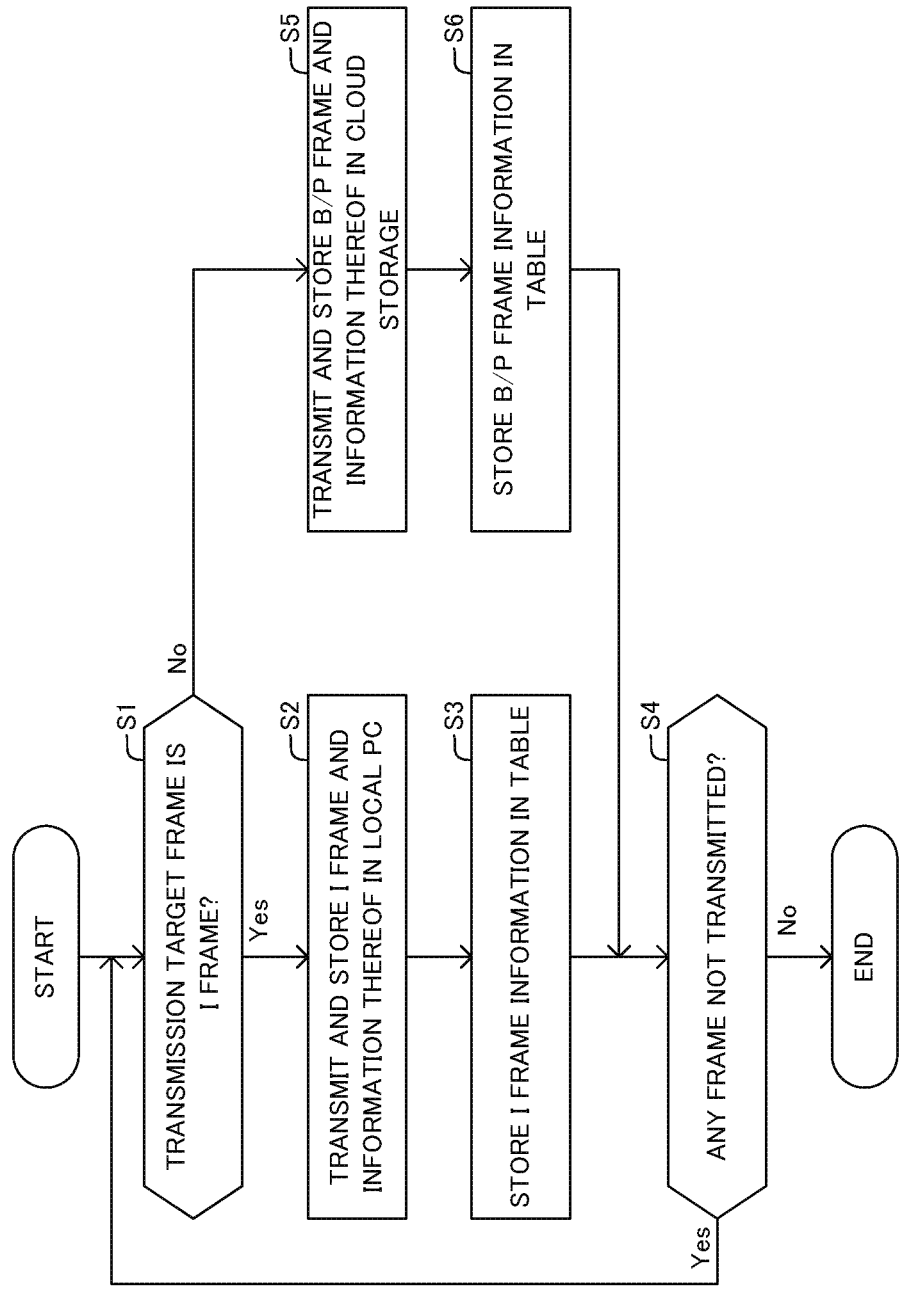
FIG. 8 is a flowchart illustrating an operation of the video capturing system disclosed in FIG. 1.

A first exemplary embodiment of the present invention will be described with reference to FIGS. 1 to 11. FIG. 1 is a diagram for illustrating a configuration of an information processing system. FIG. 2 and FIGS. 3(A) to 3(C) illustrate data structures of video data. FIGS. 4 to 7 illustrate exemplary tables stored in the information processing system. FIGS. 8 to 11 illustrate operations of the information processing system.

[Configuration]

As shown in FIG. 1, an information processing system of the present embodiment includes a video capturing system 10, cloud storage 20, and a local PC (personal computer) 30 that are connected over a network.

The video capturing system 10 has a surveillance camera 11. The surveillance camera 11 is a camera provided to a location where surveillance is desired, and captures video images. It should be noted that the surveillance camera 11 is not limited to one used for surveillance. It may be a camera to be used for other purposes, and capturing any kind of video images.

Along with it, the local PC 30 described below is not limited to one used for reproducing video data but may be a video processing device that performs other processes such as analysis of video data. This means that the information processing system of the present invention is a system storing a large number of units of large-volume video data to be reproduced or analyzed by the local PC 30, such as a surveillance camera system, a video archive system, and a video distribution system.

The video capturing system 10 is also an information processing device having an arithmetic unit and a storage unit. The video capturing system 10 includes an encoding unit 12, a frame type determination unit 13, a difference frame information transmission unit 14, and an I frame information transmission unit 15, which are constructed by the arithmetic unit executing a program.

The encoding unit 12 performs compression coding (encoding) video data captured by the surveillance camera 11 according to a compression coding standard conforming to MPEG (Moving Picture Experts Group) standard. It should be noted that compression coding standards conforming to MPEG standard include MPEG4 (ISO/IEC 14496, ITU-T H.264), MPEG2 (ISO/IEC 13818), H.264 (ISO/IEC 14496-10), and the like.

Here, the structure of compression coding conforming to MPEG standard will be described with reference to FIG. 2. In the compression coding method conforming to MPEG standard, a technique called inter-frame prediction is used. Inter-frame prediction is a technique of holding only difference information between frames to thereby reduce the amount of data.

When compression coding is performed, video data is configured of frames of I frames, P frames, and B frames as in the example of FIG. 2. The configuration of FIG. 2 is an example. A configuration in which the numbers of P frames and B frames between I frames are different, and a configuration in which the number of frames in a GOP (Group Of Picture) is different, are also acceptable.

I frame (intra-frame) is a frame that is a basis of inter-frame prediction, which is a frame on which only intra-frame compression coding is performed. P frame (predictive-frame) is a frame only having difference information between it and the previous frame. B frame (bi-directional-frame) is a frame only having difference information between it and the previous and following frames. As described above, as the P frame and the B frame are frames having only difference information with respect to other frames, they have less data capacity than I frame. This means that I frame is generally a frame having larger data capacity than P frame and B frame.

In general, most of the capacity of a moving image to which MPEG compression coding is applied is the data capacity of I frames. In a moving image containing typical motions, the percentage thereof is 40%. In a video containing fewer motions such as a surveillance camera video, the percentage thereof is much larger (50% to 70%). It should be noted that a frame serving as the basis of inter-frame prediction in H.264 is called IDR (Instantaneous Decoder Refresh).

The frame type determination unit 13 acquires video data, to which compression coding is applied, from the encoding unit 12, and determines the types of the respective frames constituting the video data. Then, according to the determination result, the respective frames are distributed. In the present embodiment, it is determined whether each of the frames constituting the video data to which MPEG compression coding is applied is an I frame, a P frame or a B frame. Then, the frames determined to be I frames are distributed to the I frame information transmission unit 15, and the other frames, that is, the frames determined to be P frames and B frames, are distributed to the difference frame information transmission unit 14.

The I frame information transmission unit 15 transmits the distributed I frames and information of the I frames to the local PC 30 and stores them therein. At this time, the I frame information transmission unit 15 also transmits, as the I frame information, the frame number and the frame type each frame.

Meanwhile, the difference frame information transmission unit 14 transmits the distributed P frames and B frames and the information of the frames to the cloud storage 20, and stores them therein. Further, the difference frame information transmission unit 14 transmits the information of the P frames and the B frames to the local PC 30.

Specifically, to the cloud storage 20, the difference frame information transmission unit 14 transmits the frame number of each frame as the information of the P frame or the B frame, for example. On the other hand, the difference frame information transmission unit 14 transmits, as information of the P frames or the B frames, the frame number and the frame type of each frame, the reference frame number, and the ID of the cloud storage 20 to which the frame is transmitted, to the local PC 30. Here, in the case where there are units of cloud storage 20 to which the frames are transmitted, each unit of cloud storage 20 is assigned with an ID.

Next, a configuration of the cloud storage 20 (transmission device) will be described. The cloud storage 20 is a storage unit provided on the network. The cloud storage 20 includes an arithmetic unit and a storage unit, and also a difference frame storage unit 21 formed in the storage unit. The cloud storage 20 has a function of storing frames and information of the frames and transmitting the frames to the local PC 30, as described below, when the arithmetic unit executes a program.

Specifically, the cloud storage 20 receives P frames and B frames transmitted from the video capturing system 10, and stores hem in the difference frame storage unit 21. The cloud storage 20 also adds a new record in a difference frame storage table illustrated in FIG. 6, formed in the difference frame storage unit 21, and stores a storage path and the frame number of the stored frame in a "difference frame storage path" column and a "frame number" column.

Next, a configuration of the local PC 30 (video processing device) will be described. The local PC 30 is a terminal mainly operated by a user who monitors video data to reproduce video data, which is a typical information processing device including an arithmetic unit, a storage unit, a display unit 38, and other units. The local PC 30 includes an I frame compression unit 33, an I frame restoration unit 34, a reproduction time frame acquisition unit 36, and a decoding unit 37, which are constructed by the arithmetic unit executing a program. The local PC 30 also includes a frame information storage unit 31, an I frame storage unit 32, and a difference frame temporary storage unit 35, which are formed in the storage unit. It should be noted that the local PC 30 also has a function of storing frames and information of the frames as described below, which is provided by the arithmetic unit executing a program.

Specifically, the local PC 30 receives an I frame transmitted from the video capturing system 10, and stores it in the I frame storage unit 32. The local PC 30 also adds a new record to the I frame storage table, illustrated in FIG. 5, formed in the I frame storage unit 32, and stores the storage path and the frame number of the stored frame in the "I frame storage path" column and the "frame number" column, respectively. At this time, "uncompressed" is set in the "I frame compression status" column and the "frame type after compression of I frame" column is blank.

Further, the local PC 30 stores information of each frame transmitted from the video capturing system 10, in the frame information table, illustrated in FIG. 4, formed in the frame information storage unit 31. Specifically, the local PC 30 adds a new cord to the frame information table, and stores the notified frame number and the frame type in the "frame number" column and the "frame type" column, respectively. Then, in the case of an I frame, the "reference frame number" column is blank because there is no frame to be referred to. Further, of "stored" is put in the "frame storing status" column because the local PC 30 has an I frame. The "cloud storage ID" column is blank. On the other hand, in the case of a P frame or a B frame, a value of a notified reference frame number is put in the "reference frame number" column, and a value of "not stored" is put in the "frame storing status" column. Further, an ID of the notified cloud storage is stored in the "cloud storage ID" column.

Further, the I frame compression unit 33 of the local PC 30 performs compression coding (processing by the compression coding system conforming to MPEG standard, for example) on the I frame stored in the I frame storage unit 32. While the details of the compression coding will be described in the description of operation, FIGS. 3(A) to 3(C) illustrate a state of a frame configuration at the time of compression. FIG. 3(A) illustrates video data, in which only I frames are assumed to be stored in the I frame storage unit 32 as illustrated in FIG. 3(B). The I frames are further applied with compression coding as illustrated in FIG. 3(C). Consequently, some frames become P frames or B frames after compression, while some frames remain as I frames. In this way, by further applying compression coding to I frames and storing them in the I frame storage unit 32, it is possible to reduce the volume of data to be stored in the local PC 30.

Then, when the compressed frame is still an I frame, the I frame compression unit 33 changes the "I frame compression" column of the I frame storage table in the I frame storage unit 32 illustrated in FIG. 5 to "compressed", and changes the "frame type after compression of I frame" column to "I frame". On the other hand, when the compressed frame becomes a P frame or a B frame, the I frame compression unit 33 changes the "I frame compression" column of the I frame storage table in the I frame storage unit 32 illustrated in FIG. 5 to "compressed", and changes the "frame type after compression of I frame" column to "P frame" or "B frame".

When the reproduction time frame acquisition unit 36 of the local PC 30 receives a video data reproduction operation from a user, the reproduction time frame acquisition unit 36 acquires information of the frame to be reproduced, from the frame information storage unit 31. This means that the reproduction time frame acquisition unit 36 refers to the frame information table in the frame information storage unit 31 illustrated in FIG. 4, and checks the frame of the frame section to be reproduced, and a reference frame required for decoding the frame. Then, the reproduction time frame acquisition unit 36 refers to the frame information table in the frame information storage unit 31 illustrated in FIG. 4 to check whether the frame type of the required frame is an I frame, a P frame, or a B frame.

When the frame type of the frame to be reproduced is an I frame, the reproduction time frame acquisition unit 36 refers to the I frame storage table illustrated in FIG. 5 and acquires an I frame from the I frame storage unit 32 of the local PC 30. At this time, if the I frame is applied with compression coding, the I frame is restored from the compressed state by the I frame restoration unit 34, whereby the original I frame is acquired. It should be noted that restoration by the I frame restoration unit 34 will be described in detail in the description of operation.

On the other hand, when the frame type of the frame to be reproduced is a P frame or a B frame, the reproduction time frame acquisition unit 36 refers to the frame information table illustrated in FIG. 4, and checks whether the frame to be reproduced is held in the local PC 30, from the frame information storage unit 31. When frame is not in the local PC 30, the reproduction time frame acquisition unit 36 checks the cloud storage ID from the frame information table, and acquires a P frame or a B frame from the cloud storage 20 of the acquired ID. At this time, the reproduction time frame acquisition unit 36 stores the acquired P frame or B frame in the difference frame temporary storage unit 35 in the local PC 30, and stores the path in the local PC 30 that is the storage destination, in the difference frame temporary saving table illustrated in FIG. 7 in the difference frame temporary storage unit 35. On the other hand, when the frame is already in the local PC 30, the reproduction time frame acquisition unit 36 refers to the difference frame temporary saving table illustrated in FIG. 7, and acquires the frame from the difference frame temporary storage unit 35.

Then, when the reproduction time frame acquisition unit 36 acquires all of the frames to be reproduced, the decoding unit 37 performs decoding on all of the frames. At his time, the reproduction time frame acquisition unit 36 transmits the frame of the frame section to be reproduced and a reference frame required for decoding the frame, to the decoding unit 37 while assigning the frame number. It should be noted that as a sequence header containing information of the image size and the like, for example, is also required to reproduce the video data, metadata such as a sequence header is also transmitted to the decoder unit 37. The capacity of the metadata such as a sequence header is small, so it may be stored in either a local side or a cloud side.

Then, the decoding unit 37 links the I frame, transmitted from the reproduction time frame acquisition unit 36, and the difference frame in the order of the frame numbers, and performs decoding. The decoding unit 37 reproduces the video data decoded in such a manner, and displays it on the display unit 38. When reproduction by the decoding unit 37 is completed, the difference frame that is not required any more is removed from the difference frame temporary storage unit 35. Thereby, capacity of the video data stored in the local PC 30 is reduced.

[Operation]

Next, operation of the information processing system described above will be described with reference to the flowcharts of FIGS. 8 to 11. First, a flow of processing at the time of storing video data will be described with reference to FIG. 8.

Regarding the video data captured by the surveillance camera 11 and applied with compression coding according to the MPEG standard, the frame type determination unit 13 of the video capturing system 10 determines the frame type (I frame, B frame, or P frame) of each frame in the video data (step S1 of FIG. 8). Then, as a result of the determination, an I frame (Yes at step S1 of FIG. 8) is transmitted by the I frame information transmission unit 15 to the local PC 30. At this time, the I frame information transmission unit 15 also transmits the frame number, assigned from the beginning of the frames, to the local PC 30.

Then, the local PC stores the transmitted I frame in the I frame storage unit 32. Further, the local PC adds a new record to the I frame storage table in the I frame storage unit 32 illustrated in FIG. 5, stores values in the "frame storage path" column and the "frame number" column, and puts "uncompressed" in the "I frame compression". The "frame type after compression of I frame" is blank (step S2 of FIG. 8).

Then, the I frame information transmission unit 15 transmits the frame number and the frame type of the I frame to the local PC 30. Upon receiving it, the local PC 30 adds a new record to the frame information table in the frame information storage unit 31 illustrated in FIG. 4, and puts values in the "frame number" column and the "frame type" column. In the case of an I frame, as there is no other frame to be referred to, the "reference frame number" column is blank. Further, a value of "stored" is put in the "frame storing status" column (step S3 of FIG. 8).

Further, as a result of determining the frame type by the frame type determination unit 13, when the frame is a P frame or a B frame (No at step S1 of FIG. 8), the difference frame information transmission unit 14 transmits it to the cloud storage 20. At this tune, the difference frame information transmission unit 14 also transmits the frame number, assigned from the beginning of the frames, to the cloud storage 20.

Then, the cloud storage 20 stores the transmitted P frame or B frame in the difference frame storage unit 21. Further, a new record is added to the difference frame storage table in the difference frame storage unit 21 illustrated in FIG. 6, and values are stored in the "frame storage path" column and the "frame umber" column (step S5 of FIG. 8).

Then, the difference frame information transmission unit 14 acquires a reference frame of the P frame or the B frame referring to the compressed video data, and transmits it together with the frame number and the frame type to the local PC 30. Upon receiving it, the local PC 30 adds a new record to the frame information table in the frame information storage unit 31 illustrated in FIG. 4, and puts values in the "frame number" column, the "frame type" column, and the "reference frame number" column. Further, the local PC 30 puts a value of "not stored" in the "frame storing status" column, and stores an ID of the cloud storage in which the data is stored, in the "cloud storage ID" column (step S6 of FIG. 8).

After step S3 or S6, the video capturing system 10 checks whether or not there is a frame of the video data, applied with compression coding, that has not been transmitted to the local PC 30 or the cloud storage 20 (step S4 of FIG. 8). When here is a frame not having been transmitted (Yes at step S4 of FIG. 8), the information processing system returns to step S1, and repeats the processing described above (steps S1 to S6 of FIG. 8).

Next, processing in the case of further compressing the I frame stored in the I frame storage unit 32 in the local PC 30 will be described with reference to FIG. 9. It should be noted that it is also possible to keep the I frame in the I frame storage unit 32 as a still image (I frame) without applying compression processing. In that case, the processing described below will not be performed.

First, the I frame compression unit 33 links the I frames stored in the I frame storage unit 32 of the local PC 30 in the order from the newest frame number, and with respect to the linked I frames, defines a frame to be kept as an I frame after compression. For example, I frames are linked as illustrated in FIG. 3(B) and then, as illustrated in FIG. 3(C), an I frame is kept each 15 frames to have a frame configuration of "IPBBPBB . . . ". If there is almost no movement in the video, the interval between the frames kept as I frames may be broadened. It should be noted that the order of frames to which compression processing is applied is set such that a frame to be refereed to is applied with compression processing in preference.

Figure 9:
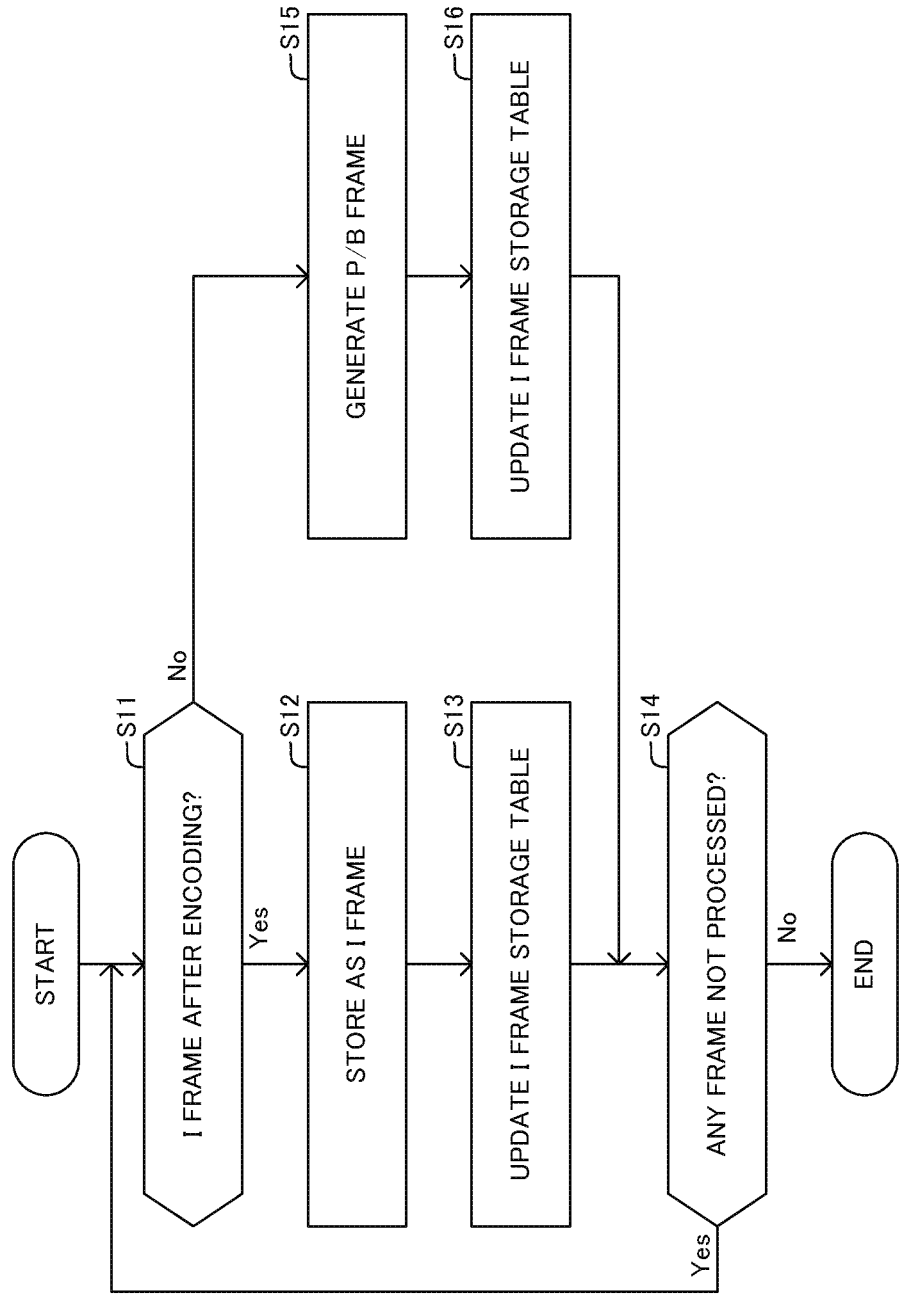
FIG. 9 is a flowchart illustrating an operation of the I frame compression unit disclosed in FIG. 1.

Then, the I frame compression unit 33 checks whether or not each of the linked I frames is a frame to be kept as an I frame after compression (step S11 of FIG. 9). Regarding a frame to be kept as an I frame after compression (Yes at step S11 of FIG. 9), it is not necessary of perform compression coding particularly, so such a frame is kept as an I frame (step S12 of FIG. 9).

Then, the I frame compression unit 33 changes the "I frame compression" column, in the I frame storage table in the I frame storage unit 32 illustrated in FIG. 5, to "compressed", and the "frame type after compression of I frame" column" changed to "I frame" (step S13 of FIG. 9).

As a result of checking whether or not the frame is kept as an I frame after compression (step S11 of FIG. 9), if the frame becomes a P frame or a B frame after compression (No at step S11 of FIG. 9), the I frame compression unit 3 generates a P frame or a B frame (step S15 of FIG. 9). Specifically, the I frame compression unit 33 performs decoding (inverse quantization, inverse discrete cosine transformation) on the reference frame, generates a reference image, calculates a difference value in dye information between the reference image and the target image, and generates a P frame or a B frame. At this time, information representing a frame that is referred to is also included in the data of the P frame or the B frame. It should be noted that the difference frame generation method used in this step utilizes the scheme of MPEG compression coding, whereby it is possible to perform compression using an existing function.

Then, the I frame compression unit 33 changes the "I frame compression"πcolumn of the I frame storage table in the I frame storage unit 32 illustrated in FIG. 5 to "compressed", and changes the "frame type after compression of I frame" to "P frame" or "B frame" (step S16 of FIG. 9).

After step S13 or S16, if there is any frame to which compression processing has not been applied among the I frames in the I frame storage unit 32 (Yes at step S14 of FIG. 9), the video capturing system 10 returns to step S11, and repeats the processing described above (steps S11 to S16 of FIG. 8).

Next, a flow of processing at the time of reproducing video data by the local PC 30 will be described with reference to FIG. 10. In the case of performing video reproduction or special operation such as jumping or fast forwarding, when a user moves the seek bar on the video reproduction screen of the local PC 30, the point where the user desires to reproduce the video image is designated (step S21 of FIG. 10).

Then, the reproduction time frame acquisition unit 36 acquires a record of the frame number of the designated point, from the frame information table in the frame information storage unit 31 illustrated in FIG. 4. Then, the reproduction time frame acquisition unit 36 acquires the frame number to be referred to, from the "reference frame number" column in the acquired record, and also acquires all of the records on the columns of the respective reference frame numbers, from the frame information table (step S22 of FIG. 10).

Figure 10:
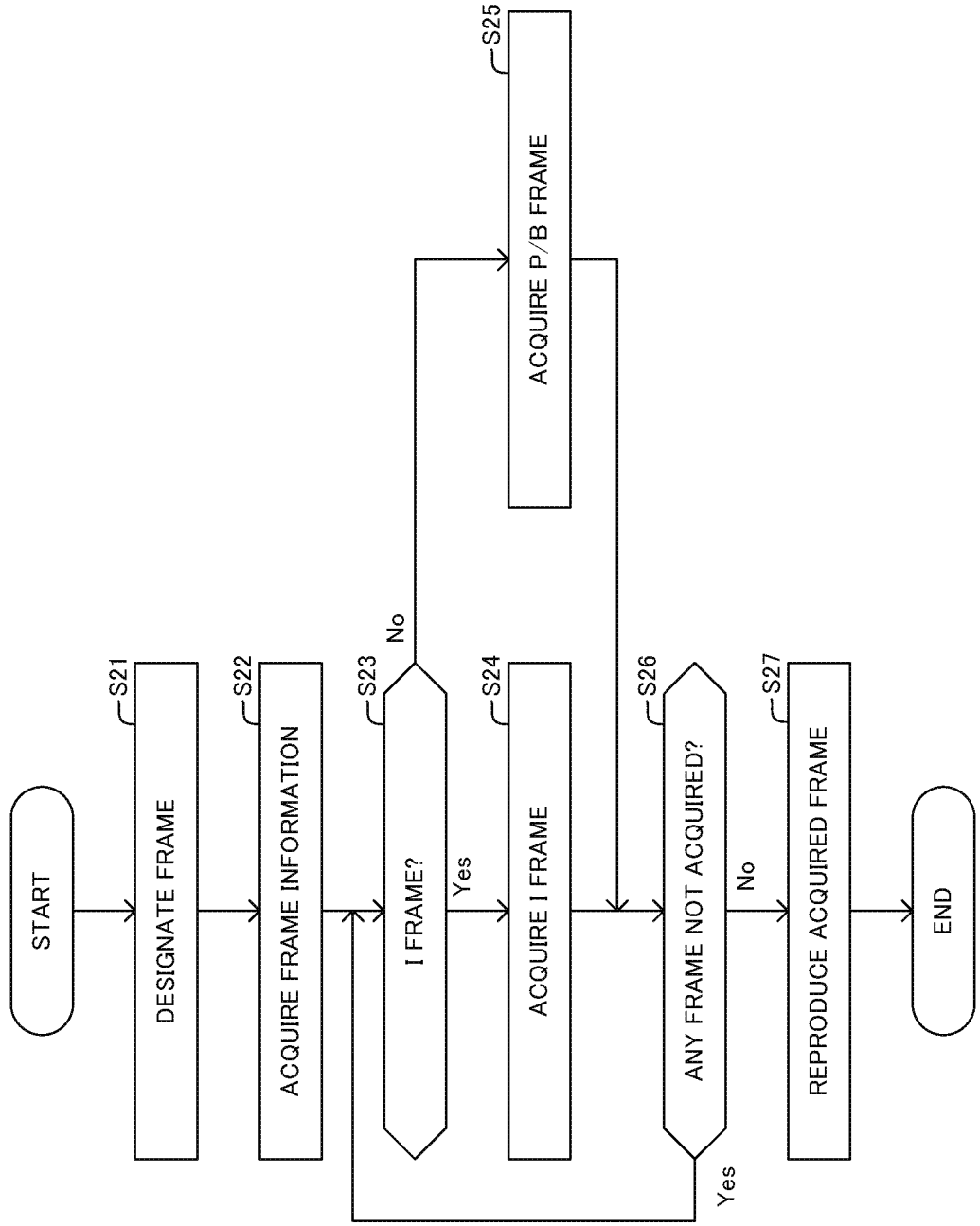
FIG. 10 is a flowchart illustrating an operation at the time of reproducing video data by the local PC disclosed in FIG. 1.

Then, the reproduction time frame acquisition unit 36 refers to the frame information acquired as describe above, and checks whether the frame type is I frame, from the information in the "frame type" column (step S23 of FIG. 10). When the frame type is I frame (Yes at step S23 of FIG. 10), the reproduction time frame acquisition unit 36 refers to the "I frame compression" column from the I frame storage table in the I frame storage unit 32 illustrated in FIG. 5. When the "I frame video compression" column shows "compressed", the I frame restoration unit 34 performs restoration of the linked I frame described below to obtain the original I frame (step S24 of FIG. 10). When the "I frame video compression" column shows"uncompressed", the reproduction time frame acquisition unit 36 refers to the path stored in the "I frame storage path" column of the I frame storage table in the I frame storage unit 32 illustrated in FIG. 5, and acquires the frame data of the path as I frame data as it is (step S24 of FIG. 10).

On the other hand, when the frame type of the frame information acquired at step S22 is not I frame but P frame or B frame (No at step S23 of FIG. 10), the reproduction time frame acquisition unit 36 refers to the "frame storing status" column of the frame information table in the frame information storage unit 31 illustrated in FIG. 4. Then, it is checked whether or not the frame has been in the local PC 30. If it is in the local PC 30, the reproduction time frame acquisition unit 36 acquires frame data from the difference frame temporary storage unit 35 (step S25 of FIG. 10). If the frame is not in the local PC 30, the reproduction time frame acquisition unit 36 acquires frame data from the difference frame storage unit 21 of the cloud storage 20 (step S25 of FIG. 10). At this time, the reproduction time frame acquisition unit 36 acquires a cloud storage ID from the "cloud storage ID" column of the frame information table in the frame information storage unit 31 illustrated in FIG. 4, and acquires difference frame data from the cloud storage 20 of the acquired ID. It should be noted that the difference frame acquired from the cloud storage 20 is temporarily stored in the difference frame temporary storage unit 35 in the local PC 30, and the path is stored in the difference frame temporary saving table illustrated in FIG. 7.

Thereafter, regarding the frame information acquired at step S22, if there is any frame data not having been acquired (Yes at step S26 of FIG. 10), the reproduction time frame acquisition unit 36 returns to step S23, and repeats the processing described above (steps S23 to S26 of FIG. 10).

Then, after acquiring every frame data of the frame information acquired at step S22 (No at step S26 of FIG. 10), the reproduction time frame acquisition unit 36 reproduces video data consisting of the frame data (step S27 of FIG. 10). Specifically, the reproduction time frame acquisition unit 36 transmits all of the frame data and the frame numbers to the decoding unit 37. Then, the decoding unit 37 links I frames and difference frames (P frames and B frame) in the order of the frame number, applies decoding, and displays video images on the screen of the display unit 38.

Figure 11:
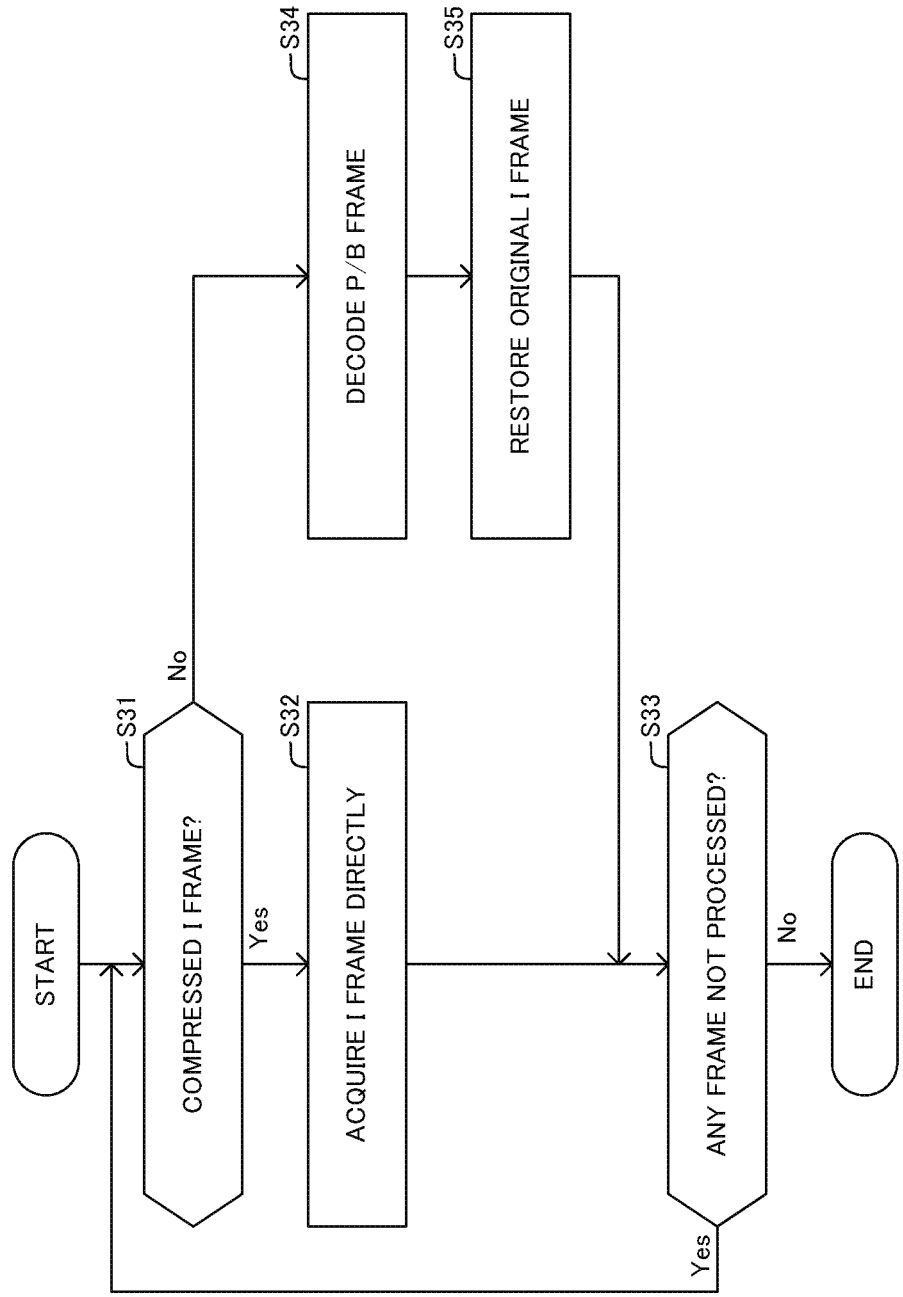
FIG. 11 is a flowchart illustrating an operation of the frame restoration unit disclosed in FIG. 1.

Here, with reference to FIG. 11, processing to restore the I frame applied with compression coding, by the I frame restoration unit 34 at step S24 of the video data reproduction processing, will be described. First, the I frame restoration unit 34 checks whether or not the "frame type after compression of I frame" of the frame to be decoded in the I frame storage unit 32 illustrated in FIG. 5 is "I frame" (step S31 of FIG. 11).

Then, when the "frame type after compression of I frame" column shows "I frame" (Yes at step S31 of FIG. 11), as it is still an I frame after the compression processing, it is not necessary to perform decoding. Accordingly, the I frame restoration unit 34 acquires the I frame data as it is (step S32 of FIG. 11). On the other hand, when the "frame type after compression of I frame" column shows "P frame" or "B frame" (No at step S31 of FIG. 11), the I frame restoration unit 34 performs decoding, and generates the original image (image having dye information) (step S34 of FIG. 11). Then, the I frame restoration unit 34 performs intra-frame compression coding on the generated original image data, and acquires I frame data (step S35 of FIG. 11).

Then, when there is a frame not having been decoded among the frames to be decoded (Yes at step S33 of FIG. 11), the I frame restoration unit 34 returns to step S31, and repeats the processing described above (steps S31 to S35 of FIG. 11).

As described above, in the present invention, only I frames of the video compressed in a manner such as MPEG are stored in the local PC 30, and the other difference frames (P and B frames) are stored in the cloud storage 20. Thereby, it is possible to significantly reduce the communication band at the time of reproducing the video, while reducing the storage capacity of the local PC 30. As a result, it is possible to reproduce the video with good response, including special operation such as jumping at the time of reproduction. Even in the case where the local PC 30 performs video analysis, it is possible to deliver a video frame of the designated time part to the local PC 30 without delay.

For example, in the case where data cannot be acquired immediately from the cloud due to consistency constraints of the cloud storage, it possible to only reproduce I frames in the local PC. As such, it is possible to perform simple video reproduction before completion of acquisition of the data from the cloud, which enables flexible reproduction.

Further, in the present invention, I frames held in the local PC 30 are linked, and further, the frames are compressed using the MPEG compression coding function and stored. Thereby, it is possible to further compress the storage capacity in the local PC 30. Particularly, by using the system for the surveillance camera video, as there are less movements in the video, the compression efficiency of the linked I frames increases, whereby the amount of data can be reduced significantly.

Furthermore, only difference frames (P and B frames) exist on the cloud storage 20, and the video cannot be restored and reproduced without I frames. Therefore, this system can also be used as a countermeasure against information leakage of the cloud storage 20.

It should be noted that while description has been given above based on the premise that the local PC 30 performs processing to reproduce video data, the local PC 30 may perform different processing on video data. For example, the local PC 30 may analyze video data. Thereby, in the case of performing simple analysis on the I frames stored in the local PC 30, analysis processing can be performed stably at a high speed. Further, it is also possible to perform analysis in more detail by acquiring difference are from the cloud storage 20 when necessary.

Second Exemplary Embodiment

Figure 12:
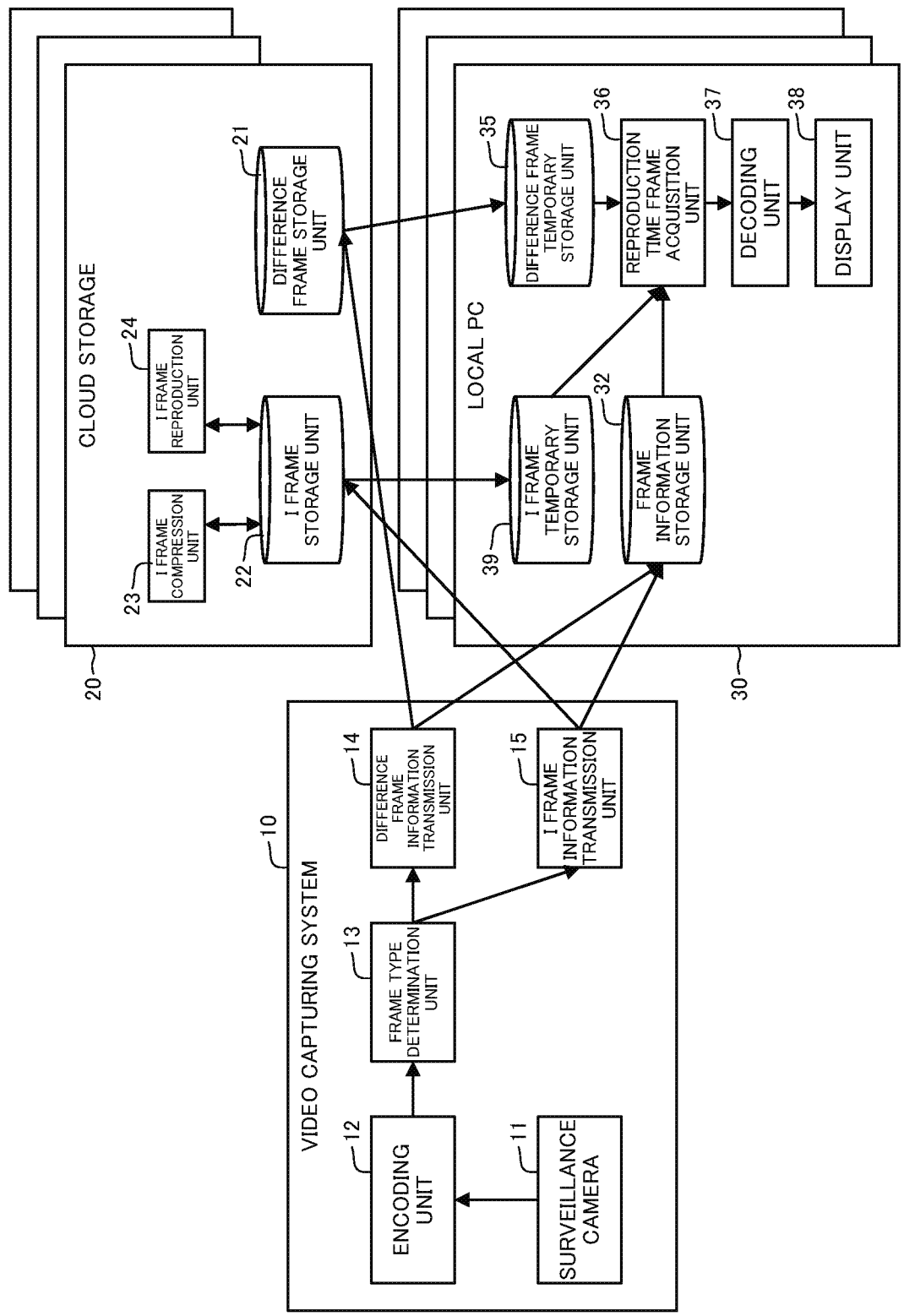
FIG. 12 is a functional block diagram illustrating a configuration of an information processing system according to a second exemplary embodiment of the present invention.

Next, a second exemplary embodiment of the present invention will be described with reference to FIG. 12. FIG. 12 is a functional block diagram illustrating a configuration of an information processing system of the present embodiment.

As illustrated in FIG. 12, an information processing system of the present embodiment has a configuration that is almost similar to that of the first exemplary embodiment, except for the point described below. In the information processing system of the present embodiment, the I frame storage unit 32, the I frame compression unit 33, the I frame restoration unit 34, provided to the local PC 30 as described in the first exemplary embodiment, are provided to the cloud storage 20, as denoted by the reference numerals 22, 23, and 24. This means that the I frame information transmission unit 15 of the video capturing system 10 also stores I frames on the cloud storage 20.

In the present embodiment, the I frame temporary storage unit 39 is provided to the local PC 30, and the reproduction time frame acquisition unit 36 acquires only I frames from the cloud storage 20 in advance, and stores them in the I frame temporary storage unit 39. Thereby, only I frames are transmitted to the local PC 30 first, whereby simple reproduction (reproduction of discontinuous video) can be made first in the local PC 30. Then, the local PC 30 acquires difference frames for the part that is desired to be viewed in detail from the cloud storage 20, whereby the video can be reproduced in detail.

It should be noted that while the I frame restoration unit 24 is disposed on the cloud storage 20 side in the configuration of FIG. 12, the I frame restoration unit 24 may be disposed on the local side in order to reduce the communication traffic volume between the cloud storage 20 and the local PC 30.

Third Exemplary Embodiment

Figure 13:
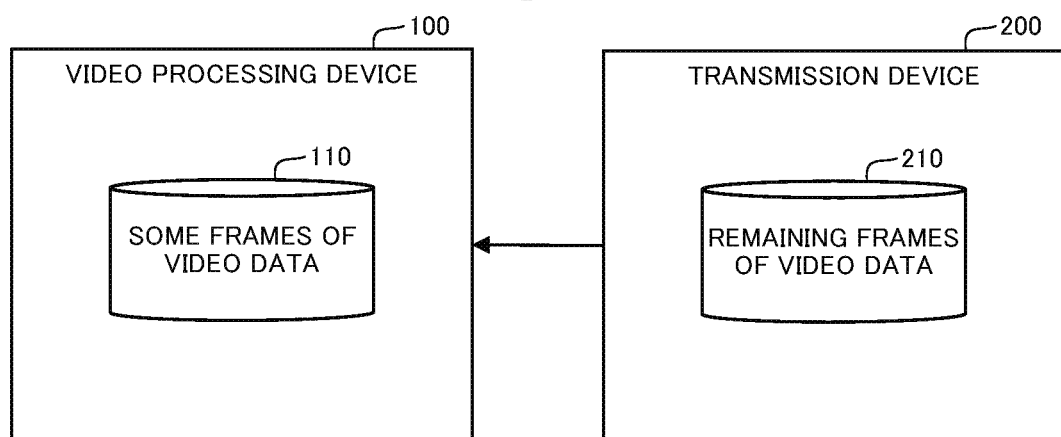
FIG. 13 is a block diagram illustrating a configuration of an information processing system according to a third exemplary embodiment of the present invention.

Next, a third exemplary embodiment of the present invention will be described with reference to FIG. 13. FIG. 13 is a block diagram illustrating a configuration of an information processing system of the present embodiment.

The information processing system of the present embodiment includes a video processing device 100 that processes video data consisting of a plurality of frames, and a transmission device 200 that transmits video data, to be processed by the video processing device 100, to the connected video processing device 100.

Then, the video processing device 100 stores some frames 110 of the video data constituting the video data. On the other hand, the transmission device 200 stores the remaining frames 210 of the video data not stored in the video processing device 100.

According to such a configuration, the video processing device 100 only stores some frames 110 of the video data, and the remaining frames 210 are stored in the transmission device 200. Accordingly, the storage capacity of the video processing device 100 can be reduced.

In addition, when processing to reproduce video data is performed by the video processing device 100, processing to reproduce the some frames 110 stored in the video processing device 100 can be performed. Accordingly, there is no need to acquire the rest of the video data from the connected transmission device 200, whereby processing can be performed stably at a high speed.

<Supplementary Notes>

The whole or part of the exemplary embodiments disclosed above can be described as, but not limited to, the following supplementary notes. Hereinafter, the outlines of the configurations of an information processing system, a video processing device, a program, and a video data processing method, according to the present invention, will be described. However, the present invention is not limited to the configurations described below.

(Supplementary Note 1)

An information processing system comprising:

a video processing device that processes video data including a plurality of frames; and a transmission device that transmits the video data, to be processed by the video processing device, to the video processing device connected, wherein the video processing device stores some frames constituting the video data, and the transmission device stores remaining frames, not stored in the video processing device, of the video data.

With the above-described configuration, the video processing device only stores some frames of the video data, and the remaining frames are stored in the transmission device. Therefore, it is possible to suppress the storage capacity of the video processing device. In addition, when reproducing the video data by the video processing device, it is possible to perform processing stably at a high speed by performing processing to reproduce the some frames stored in the video processing device, for example.

(Supplementary Note 2)

The information processing system according to supplementary note 1, wherein each of the some frames constituting the video data, stored in the video processing device, has a capacity larger than a capacity of each of the remaining frames constituting the video data.

With this configuration, as the frame having a larger capacity is stored in the video processing device, processing can be performed more stably at a higher speed compared with the case of performing processing by receiving such a frame from the transmission device.

(Supplementary Note 3)

The information processing system according to supplementary note 1 or 2, wherein the video data is encoded by compression coding, and each of the frames stored in the video processing device is a frame serving as a basis of inter-frame prediction of the video data, and each of the frames stored in the transmission device is a frame including difference information between the frames of the video data.

(Supplementary Note 4)

The information processing system according to any of supplementary notes 1 to 3, wherein the video data encoded by compression coding conforming to MPEG standard, and each of the frames stored in the video processing device is an I frame serving as a basis of inter-frame prediction of the video data, and each of the frames stored in the transmission device is a P frame or a B frame including difference information between the frames of the video data.

Thereby, the video processing device is able to process I fracases stored in the own device stably at a high speed.

(Supplementary Note 5)

The information processing system according to any of supplementary notes 1 to 4, wherein the video processing device stores the some frames constituting the video data in a state of being encoded by compression coding.

(Supplementary Note 6)

The information processing system according to supplementary note 5, wherein the video processing device stores the some frames constituting the video data in a state of being encoded by compression coding conforming to MPEG standard.

Thereby, as the video processing device stores the some frames in a further compressed state, it is possible to reduce the storage capacity.

(Supplementary Note 7)

A non-transitory computer-readable medium storing a program comprising instructions for causing a video processing device to perform operations including, the video processing device being configured to process video data including a plurality of frames, storing some frames constituting the video data, processing the stored some frames, and processing remaining frames constituting the video data, not stored in the video processing device, upon receiving the remaining frames from a transmission device that stores the remaining frames.

(Supplementary Note 8)

The non-transitory computer-readable medium storing the program, according to supplementary note 7, further comprising instructions for causing the video processing device to perform operations including, storing, as each of the some frames constituting the video data, a frame having a capacity larger than a capacity of each of the remaining frames constituting the video data stored in the transmission device.

(Supplementary Note 9)

The non-transitory computer-readable medium storing the program, according to supplementary note 7 or 8, wherein the video data is encoded by compression coding, each of the frames stored in the transmission device is a frame including difference information between the frames of the video data, and the program further comprises instructions for causing the video processing device to perform operations including storing a frame serving as a basis of inter-frame prediction of the video data, as each of the some frames constituting the video data.

(Supplementary Note 10)

The non-transitory computer-readable medium storing the program, according to any of supplementary notes 7 to 9, wherein the video data is encoded by compression coding conforming to MPEG standard, each of the frames stored in the transmission device is a P frame or a B frame including difference information between the frames of the video data, and the program further comprises instructions for causing the video processing device to perform operations including storing an I frame serving as a basis of inter-frame prediction of the video data, as each of the some frames constituting the video data.

(Supplementary Note 11)

The non-transitory computer-readable medium storing the program, according to any of supplementary notes 7 to 10, further comprising instructions for causing the video processing device to perform operations including, storing the some frames constituting the video data in a state of being encoded by compression coding.

(Supplementary Note 12)

The non-transitory computer-readable medium storing the program, according to supplementary note 11, further comprising instructions for causing the video processing device to perform operations including, storing the some frames constituting the video data in a state of being encoded by compression coding conforming to MPEG standard.

(Supplementary Note 13)

A video data processing method for processing video data including a plurality of frames by a video processing device that stores some frames constituting the video data, the method comprising by the video processing device, processing the stored some frames, and processing remaining frames constituting the video data not stored in the video processing device, upon receiving the remaining frames from a transmission device that stores the remaining frames.

(Supplementary Note 14)

The video data processing method according to supplementary note 13, wherein the video processing device stores, as each of the some frames constituting the video data, a frame having a capacity larger than a capacity of each of the remaining frames constituting the video data stored in the transmission device.

(Supplementary Note 15)

The video data processing method according to supplementary note 13 or 14, wherein the video data is encoded by compression coding, the video processing device stores a frame serving as a basis of inter-frame prediction of the video data, as each of the some frames constituting the video data, and the transmission device stores a frame including difference information between the frames of the video data.

(Supplementary Note 16)

The video data processing method according to any of supplementary notes 13 to 15, wherein the video data is encoded by compression coding conforming to MPEG standard, the video processing device stores an I frame serving as a basis inter-frame prediction of the video data, as each of the some frames constituting the video data, and the transmission device stores a P frame or a B frame including difference information between the frames of the video data.

(Supplementary Note 17)

The video data processing method according to any of supplementary notes 13 to 16, wherein the video processing device stores the some frames constituting the video data in a state of being encoded by compression coding.

(Supplementary Note 18)

The video data processing method according to supplementary note 17, wherein the video processing device stores the some frames constituting the video data in a state of being encoded by compression coding conforming to MPEG standard.

(Supplementary Note 19)

A video processing device that processes video data including a plurality of frames, wherein the video processing device stores some frames constituting the video data, and the video processing device processes the stored some frames, and processes remaining frames constituting the video data not stored therein, upon receiving the remaining frames from a transmission device that stores the remaining frames.

(Supplementary Note 20)

The video processing device according to supplementary note 19, wherein the video processing device stores, as each of the some frames constituting the video data, a frame having a capacity larger than a capacity of each of the remaining frames constituting the video data stored in the transmission device.

(Supplementary Note 21)

The video processing device according to supplementary note 19 or 20, wherein the video data is encoded by compression coding, each of the frames stored in the transmission device a frame including difference information between the frames of the video data, and the video processing device stores a frame serving as a basis of inter-frame prediction of the video data, as each of the some frames constituting the video data.

(Supplementary Note 22)

The video processing device according to any of supplementary notes 19 to 21, wherein the video data is encoded by compression coding conforming MPEG standard, each of the frames stored in the transmission device is a P frame or a B frame including difference information between the frames of the video data, and the video processing device stores an I frame serving as a basis inter-frame prediction of the video data, as each of the some frames constituting the video data.

(Supplementary Note 23)

The video processing device according to any of supplementary notes 19 to 22, wherein the video processing device stores the some frames constituting the video data in a state of being encoded by compression coding.

(Supplementary Note 24)

The video processing device according to supplementary note 23, wherein the video processing device stores the some frames constituting the video data in a state of being encoded by compression coding conforming to MPEG standard.

It should be noted that the program described above may be stored in a storage unit or on a computer-readable medium. For example, a medium is a portable medium such as a flexible disk, an optical disk, a magneto-optical disk, or a semiconductor memory.

While the present invention has been described with reference to the exemplary embodiments described above, the present invention is not limited to the above-described embodiments. The form and details of the present invention can be changed within the scope of the present invention in various manners that can be understood by those skilled in the art.

The invention claimed is:

1. An information processing system comprising:
   a video processing device that processes video data; and
   a video acquisition system configured to:
      acquire video data;
      generate base frames and first difference frames by performing compression coding on the acquired video data, the base frames being frames serving as a basis of inter-frame prediction, and the first difference frames being frames including difference information between frames of the video data; and
      cause the base frames and the first difference frames to be stored in a storage device that is connected with the video processing device over a network,
   wherein the video processing device is configured to:
   when replaying the acquired video data:
      first, receive the base frames from the storage device, and start replaying of the video data based solely on the received base frames; and
      after the replaying of the video data becomes executable, receive the first difference frames from the storage device, and replay the video data based on the base frames and the first difference frames, wherein the storage device is configured to generate second difference frames by performing second compression coding with use of inter-frame prediction on the base frames generated by the video acquisition system and stored in the storage device, and wherein the video processing device is configured to decode the base frames on which the second compression coding has been performed.

2. The information processing system according to claim 1, wherein the video processing device is configured to:
receive only partial difference frames out of the first difference frames from the storage device, the partial difference frames being frames within a partial range of the acquired video data; and
replay the video data based on the base frames and the partial difference frames when replaying the partial range of the acquired video data.

3. An information processing method performed by a video processing device for processing video data acquired by a video acquisition system configured to:
generate base frames and first difference frames by performing compression coding on the acquired video data, the base frames being frames serving as a basis of inter-frame prediction, and the first difference frames being frames including difference information between frames of the video data; and
cause the base frames and the first difference frames to be stored in a storage device that is connected with the video processing device over a network, the information processing method comprising when replaying the acquired video data:
first, receiving the base frames from the storage device, and starting replaying of the video data based solely on the received base frames; and
after the replaying of the video data becomes executable, receiving the first difference frames from the storage device, and replaying the video data based on the base frames and the first difference frames, wherein the storage device is configured to generate second difference frames by performing second compression coding with use of inter-frame prediction on the base frames generated by the video acquisition system and stored in the storage device, and wherein the video processing device is configured to decode the base frames on which the second compression coding has been performed.

4. The information processing method according to claim 3, further comprising:
receiving only partial difference frames out of the first difference frames from the storage device, the partial difference frames being frames within a partial range of the acquired video data; and
replaying the video data based on the base frames and the partial first difference frames when replaying the partial range of the acquired video data.

5. A non-transitory computer-readable storage medium storing a program comprising instructions that causes a computer for processing video data acquired by a video acquisition system to perform an information processing method, the video acquisition system being configured to:
generate base frames and first difference frames by performing compression coding on the acquired video data, the base frames being frames serving as a basis of inter-frame prediction, the first difference frames being frames including difference information between frames of the video data; and
cause the base frames and the first difference frames to be stored in a storage device that is connected with the computer over a network, the information processing method includes when replaying the acquired video data:
first, receiving the base frames from the storage device, and starting replaying of the video data based solely on the received base frames; and
after the replaying of the video data becomes executable, receiving the first difference frames from the storage device, and replaying the video data based on the base frames and the first difference frames, wherein the storage device is configured to generate second difference frames by performing second compression coding with use of inter-frame prediction on the base frames generated by the video acquisition system and stored in the storage device, and wherein the video processing device is configured to decode the base frames on which the second compression coding has been performed.

6. The storage medium according to claim 5, wherein the information processing method comprises:
receiving only partial difference frames out of the first difference frames from the storage device, the partial difference frames being frames within a partial range of the acquired video data; and
replaying the video data based on the base frames and the partial difference frames when replaying the partial range of the acquired video data.

* * * * *